March 4, 1947.    C. L. EKSERGIAN    2,416,869
BRAKE ARRANGEMENT
Filed Feb. 22, 1945    2 Sheets-Sheet 1
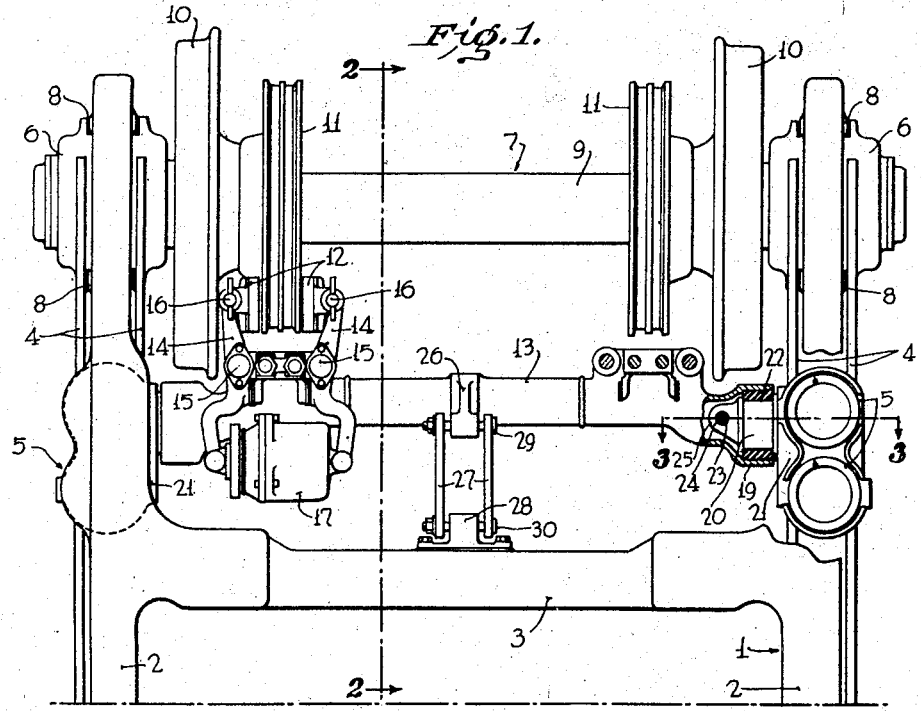
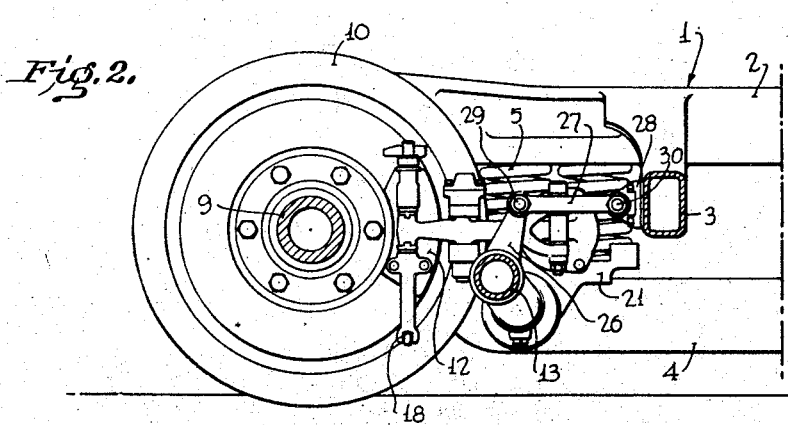
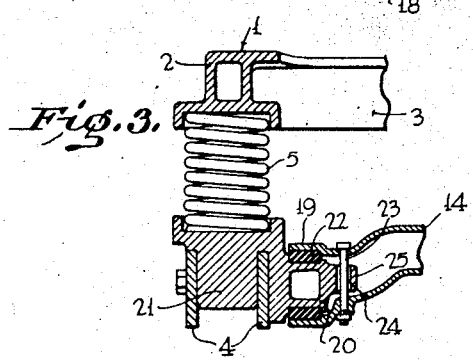
Carolus L. Eksergian
INVENTOR
BY John P. Tartro
ATTORNEY March 4, 1947.　　　C. L. EKSERGIAN　　　2,416,869
BRAKE ARRANGEMENT
Filed Feb. 22, 1945　　　2 Sheets-Sheet 2
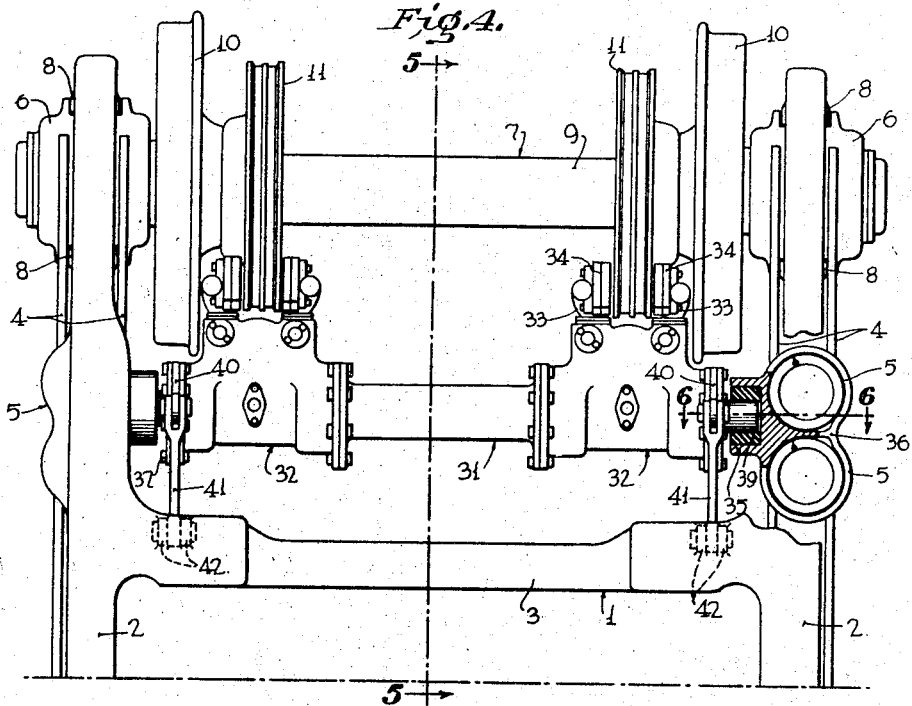
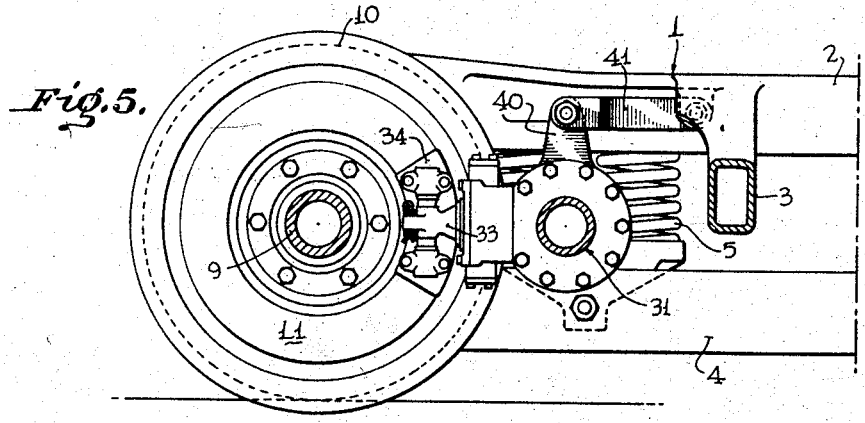
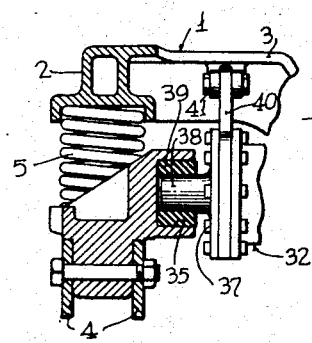
Carolus L. Eksergian
INVENTOR
BY John P. Bishop
ATTORNEY Patented Mar. 4, 1947

2,416,869

UNITED STATES PATENT OFFICE 2,416,869

BRAKE ARRANGEMENT

Carolus L. Eksergian, Detroit, Mich., assignor to The Budd Company, Philadelphia, Pa., a corporation of Pennsylvania Application February 22, 1945, Serial No. 579,174

5 Claims. (Cl. 188—59)

The invention relates to a brake mechanism and more particularly to such a mechanism adapted for use in vehicles, such as railway trucks, and is an improvement over the arrangement disclosed and claimed in copending application Serial No. 694,796 filed September 4, 1946, a division of copending application Serial No. 502,721 filed September 17, 1943.

It is an object of the invention to simplify the support of the brake mechanism and to provide for the cushioned carrying of the gravity load of the support, other than the torque load wholly from the equalizers of the truck.

It is a further object to provide simple and efficient means for transmitting the torque load to the vehicle frame in such manner as to have no effect on the springing of the frame.

It is also an object to provide a simple and efficient safety means to prevent excessive lateral movement between the respective equalizers carrying the brake support.

These and other objects and advantages will become fully apparent from the following detailed description when read in connection with the drawings forming a part of this specification.

In the drawings:

Fig. 1 is a plan view of one half of a railway truck showing the invention applied thereto, parts being broken away and shown in section;

Fig. 2 is a sectional side elevational view of the truck, the section being taken substantially along the lines 2—2 of Fig. 1;

Fig. 3 is a fragmentary sectional view, the section being taken substantially along the line 3—3 of Fig. 1;

Figs. 4, 5 and 6 are views similar, respectively, to Figs. 1, 2 and 3, showing a modified form of the invention.

The railway truck to which the invention is shown applied comprises the frame 1 including the usual side frames 2, 2 interconnected by transoms, as 3. The side frames are supported from the longitudinally extending equalizers, 4, 4, through the usual spring nests 5, 5, and the equalizers are in turn supported from the journal boxes 6, 6 at the ends of the spaced wheel and axle assemblies, as 7. The side frames are guided for relative vertical movement with respect to the wheel and axle assembly by the usual pedestal guides 8, 8.

The wheel and axle assembly 7 comprises the axle 9 having its ends journaled in the journal boxes, the spaced wheels 10, 10 and brake rotors 11, 11. The latter may comprise disc-like members having opposed radial braking faces, one associated with each wheel of the assembly, to rotate therewith.

With each disc rotor 11 are associated in cooperative relation with its opposed radial braking faces, a pair of brake stators, in this embodiment, arcuate segmental shoes 12.

The support for the shoes 12 comprises a transversely extending support beam 13 extending close to the peripheries of the rotors 11, 11 and having its ends offset to clear the wheels and secured by cushioned flexible joint structures to the respective equalizers 4. The shoes 12, 12 for each rotor 11 are carried by this support beam through brake levers 14, 14, pivoted intermediate their ends at 15, 15 on the support beam and pivotally carrying at 16, 16 the respective shoes and at their opposite extremities, the power actuator 17, comprising in this case, a cylinder and piston actuator. The opposed shoes 12, 12 may be maintained in parallel relation by a suitable guide means, indicated at 18, Fig. 2. According to the invention the support beam 13 and the parts carried thereby are supported in such manner that their gravity load is carried wholly by the respective equalizers 4, 4, through the cushioned flexible joint structure now to be described in detail.

Each joint structure comprises a socket 19 formed by the enlarged tubular end of the support beam within which is loosely received a stud 20 projecting from the adjacent equalizer 4. This stud is shown as formed integral with the spring seat 21 rigidly seated and secured on the equalizer, shown in this instance, to be of the two bar type. To allow the necessary flexibility between the joined parts and particularly to cushion the gravity loads, which are magnified by uneven road beds, a rubber annulus 22 of substantial thickness is disposed between the socket 19 and stud 20.

As a safety feature to prevent excessive lateral movements between the joined parts, such as might happen in case of derailment, a safety pin is provided consisting of a bolt 23 passing through the tubular end of the support and an enlarged hole 24 formed in a reduced extension 25 of the stud 20. The lost motion between the hole 24 and the bolt 23 allows the necessary movements between the joined parts, but insures that the joint will not be disrupted by excessive endwise movement between the parts.

The offset relation of the shoes with respect to the joint structures through which the support beam 14 is carried by the equalizers generates a large torque, when the brakes are applied, tending to rotate the support beam on its axis.

According to the invention this torque is transmitted to the vehicle frame in a generally longitudinal direction, so that the braking torque has little if any effect on the springing of the frame.

To so transmit the braking torque, a generally vertically extending arm 26 is secured to the central portion of the beam 13, this arm being connected by a pair of parallel links 27 extending in a generally horizontal direction from its free end to a bracket 28 on the adjacent transom 3 of the truck frame. As shown, the bolts 29 and 30 connecting the links to the arm 26 and the bracket 28, respectively, allow some play between the parts, to take care of the relative lateral and tilting movements between the brake support beam 13 and the frame 1.

In the modified form shown in Figs. 4 to 6, the arrangement is generally similar to that shown in the preferred form and corresponding parts of the truck and brake mechanism are referred to by similar reference numerals.

According to this arrangement, the brake support beam designated generally by 31 comprises, as structural parts thereof, the brake cylinder units 32 carrying the brake levers 33 and shoes 34 and housing the actuating cylinder, all as fully disclosed and claimed in copending application Serial No. 399,779 for Brake mechanism, filed June 26, 1941. The flexible joint structures between the ends of the beam 31 and the adjacent equalizer 4, are in this modification made by forming the socket 35 on the spring seat 36, associated with the adjacent equalizer 4 and securing an end unit 37 to the adjacent cylinder unit 32 of the support, this end unit being provided with a stud 38 loosely secured in the adjacent socket 35. As in the preferred form, the rubber cushioning annulus 39 is interposed between the socket 35 and stud 38.

In this modification, two torque arms 40, 40 are provided to transmit the torque to the frame, one being disposed adjacent each end of the support beam 31. Each torque arm, as 40, extends generally vertically, see Fig. 2, and it may conveniently be rigidly secured to the support beam between a cylinder unit 32 and an end unit 37 by the same set of bolts securing said units together. Each torque arm 40 is secured by a generally horizontally extending link 41 pivotally secured to its free end and having its opposite end pivotally secured to spaced lugs 42 on the adjacent transom 3. It will be understood that safety means, not shown, similar to the safety means in connection with the preferred form, may also be used in connection with this modification.

The operation of the two forms of the invention is broadly the same, in that in each the gravity load of the brake is substantially wholly carried by cushioned joint structures from the respective equalizers, thereby not only adequately cushioning the brakes against road shocks, but also permitting the necessary relative movements between the support and equalizers without unduly stressing the joined parts. The braking torque, on the other hand, is transmitted to the truck frame in a longitudinal direction, so as to have a minimum of effect upon the springing of the frame.

While several forms of the invention have been herein described in detail, it will be understood that changes and modifications may be made by those skilled in the art without departing from the main features of the invention, and such changes and modifications are intended to be covered in the appended claims.

What is claimed is:

1. In a brake arrangement, a wheel and axle assembly, longitudinally extending equalizers supported from the respective ends of said assembly, a vehicle frame sprung from said equalizers, a brake rotor carried by said assembly, a brake stator in cooperative relation to said rotor, a transversely extending brake support carrying said stator and having its ends supported wholly through cushioned joint structures on the respective equalizers when the brakes are off, a generally vertical arm rigidly connected to said support, and a generally horizontal link connecting the free end of the arm to the vehicle frame to take the braking torque.

2. In a brake arrangement, a wheel and axle assembly, longitudinally extending equalizers supported from the respective ends of said assembly, a vehicle frame sprung from said equalizers, a brake rotor carried by said assembly adjacent each wheel thereof, a brake stator in cooperative relation with each rotor, a transversely extending brake support carrying said stators, and having its ends supported wholly through cushioned joint structures on the respective equalizers when the brakes are off, a generally vertical arm rigidly connected to the central portion of said support, and a generally horizontal link means connecting the free end of the arm to the vehicle frame to take the braking torque.

3. In a brake arrangement, a wheel and axle assembly, longitudinally extending equalizers supported from the respective ends of said assembly, a vehicle frame sprung from said equalizers, a brake rotor carried by said assembly adjacent each wheel thereof, a brake stator in cooperative relation with each rotor, a transversely extending brake support carrying said stators and having its ends supported wholly through cushioned joint structures on the respective equalizers when the brakes are off, a vertical arm rigidly connected to the support adjacent its respective ends, and generally horizontal links connecting the free ends of said arms to adjacent portions of the vehicle frame to take the braking torque.

4. In a brake arrangement, a wheel and axle assembly, longitudinally extending equalizers supported from the respective ends of said assembly, a vehicle frame sprung from said equalizers, a brake rotor carried by said assembly, a brake stator in cooperative relation with said rotor, a transversely extending brake support carrying said stator, and having its ends supported wholly by said equalizers through cushioned joint structures on the respective equalizers when the brakes are off, each said joint structure comprising a socket on one of the joined members, a member on the other joined member projecting loosely into said socket and a yielding annulus inserted between said member and socket, and a generally vertical arm rigidly connected to said support and having its free end connected to the frame to take the torque by means freely permitting the relative vertical movements between brake support and vehicle frame.

5. In a brake arrangement, a wheel and axle assembly, longitudinally extending equalizers supported from the respective ends of said assembly, a vehicle frame sprung from said equalizers, a brake rotor carried by said assembly, a brake stator in cooperative relation to said rotor, a transversely extending brake support carrying said stator and having its ends supported wholly through cushioned joint structures on the respective equalizers when the brakes are off, and a generally vertically extending arm rigidly connected to said support and having its free end connected to transmit braking torque to said frame in a direction lengthwise thereof.

CAROLUS L. EKSERGIAN.

REFERENCES CITED

The following references are of record in the file of this patent:

UNITED STATES PATENTS

| Number | Name | Date |
|---|---|---|
| 2,365,460 | Eksergian et al. | Dec. 19, 1944 |
| 2,199,004 | Lord | Apr. 30, 1940 |
| 1,472,371 | Masury et al. | Oct. 30, 1923 |
| 1,930,067 | Tibbetts | Oct. 10, 1933 |
| 2,274,360 | Gaenssle | Mar. 3, 1942 |
| 2,334,024 | Nystrom et al. | Nov. 9, 1943 |